(12) United States Patent
Masarati et al.

(10) Patent No.: US 8,716,394 B2
(45) Date of Patent: May 6, 2014

(54) POLYPROPYLENE COMPOSITIONS CONTAINING FILLERS AND/OR PIGMENTS

(75) Inventors: Enrico Masarati, Castelnovo Val Tidone (IT); Enrico Costantini, Ferrara (IT)

(73) Assignee: Basell Poliolefine Italia S.r.l., Milan (IT)

(*) Notice: Subject to any disclaimer, the term of this patent is extended or adjusted under 35 U.S.C. 154(b) by 697 days.

(21) Appl. No.: 12/448,384

(22) PCT Filed: Dec. 12, 2007

(86) PCT No.: PCT/EP2007/063820
§ 371 (c)(1),
(2), (4) Date: Jun. 18, 2009

(87) PCT Pub. No.: WO2008/074712
PCT Pub. Date: Jun. 26, 2008

(65) Prior Publication Data
US 2010/0087592 A1    Apr. 8, 2010

Related U.S. Application Data

(60) Provisional application No. 60/876,741, filed on Dec. 22, 2006.

(30) Foreign Application Priority Data

Dec. 20, 2006  (EP) .................................. 06126677

(51) Int. Cl.
*B29B 17/00*   (2006.01)

(52) U.S. Cl.
USPC ........... 524/584; 524/492; 524/493; 524/504; 524/528; 524/583

(58) Field of Classification Search
USPC ................. 524/584, 492, 493, 504, 528, 583
See application file for complete search history.

(56) References Cited

U.S. PATENT DOCUMENTS

| | | |
|---|---|---|
| 4,207,373 A | 6/1980 | Segal |
| 4,399,054 A | 8/1983 | Ferraris et al. |
| 4,472,524 A | 9/1984 | Albizzati |
| 4,676,680 A | 6/1987 | Hauger et al. |
| 4,997,875 A | 3/1991 | Geddes et al. |
| 5,145,819 A | 9/1992 | Winter et al. |
| 5,264,174 A | 11/1993 | Takei et al. |
| 5,286,564 A | 2/1994 | Cecchin et al. |
| 5,302,454 A | 4/1994 | Cecchin et al. |
| 5,324,800 A | 6/1994 | Welborn, Jr. et al. |
| 5,476,911 A | 12/1995 | Morini et al. |
| 5,529,850 A | 6/1996 | Morini et al. |
| 5,627,226 A * | 5/1997 | Lustiger et al. ............... 524/90 |
| 5,698,617 A | 12/1997 | Marzola et al. |
| 5,698,642 A | 12/1997 | Govoni et al. |
| 5,753,769 A | 5/1998 | Ueda et al. |
| RE37,384 E | 9/2001 | Winter et al. |
| 6,413,477 B1 | 7/2002 | Govoni et al. |
| 6,608,224 B2 | 8/2003 | Guidotti et al. |
| 6,689,845 B1 | 2/2004 | Govoni et al. |
| 6,818,187 B2 | 11/2004 | Govoni et al. |
| 6,841,501 B2 | 1/2005 | Resconi et al. |
| 6,878,786 B2 | 4/2005 | Resconi et al. |
| 6,964,997 B2 | 11/2005 | Kikuchi et al. |
| 7,045,202 B2 | 5/2006 | Tanaka et al. |
| 7,074,871 B2 | 7/2006 | Cecchin et al. |
| 7,122,606 B2 | 10/2006 | Tonti et al. |
| 7,286,126 B2 | 10/2007 | Kim et al. |
| 7,332,556 B2 | 2/2008 | Cecchin et al. |
| 7,592,393 B2 | 9/2009 | Pelliconi et al. |
| 2003/0148083 A1 | 8/2003 | Tanaka et al. |
| 2004/0044107 A1 | 3/2004 | Kikuchi et al. |
| 2005/0052440 A1 | 3/2005 | Kim et al. |
| 2005/0106978 A1 | 5/2005 | Cheng et al. |
| 2005/0130544 A1 | 6/2005 | Cheng et al. |
| 2006/0264557 A1 | 11/2006 | Lustiger et al. |
| 2007/0066758 A1 | 3/2007 | McArdle et al. |
| 2007/0251572 A1 | 11/2007 | Hoya |
| 2009/0118414 A1 | 5/2009 | Kitade et al. |

FOREIGN PATENT DOCUMENTS

| | | |
|---|---|---|
| EP | 45977 | 2/1982 |
| EP | 129368 | 12/1984 |
| EP | 135744 | 4/1985 |
| EP | 400333 | 12/1990 |
| EP | 472946 | 3/1992 |
| EP | 485823 | 5/1992 |
| EP | 548696 | 6/1993 |
| EP | 572028 | 12/1993 |
| EP | 573862 | 12/1993 |
| EP | 662380 | 11/1994 |
| EP | 782587 | 7/1997 |
| EP | 1333056 | 8/2003 |
| GB | 2260335 | 4/1993 |
| WO | 91/02012 | 2/1991 |
| WO | 92/00333 | 1/1992 |
| WO | 00/02929 | 1/2000 |
| WO | 01/62764 | 8/2001 |
| WO | 03/011962 | 2/2003 |
| WO | 2005/005495 | 1/2005 |
| WO | 2008/074713 | 6/2008 |
| WO | 2008/074715 | 6/2008 |

OTHER PUBLICATIONS

L. Resconi et al. "Selectivity in Propene Polymerization with Metallocene Catalysts," *Chem.Rev.*, vol. 100(4), p. 1253-1345 (2000).
A. Gnatowski et al., "Investigations of the influence of compatibilizer and filler type on the properties of chosen polymer blends," *Journal of Materials Processing Technology*, vol. 162-163, p. 52-58 (2005).

* cited by examiner

*Primary Examiner* — Peter D Mulcahy

(57) ABSTRACT

Polypropylene compositions having a MFR value (2.16 kg, 230° C.) from 15 to 200 g/10 min., comprising:
A) a propylene polymer or polymer composition selected from propylene homopolymers or copolymers of propylene containing up to 5% by moles of comonomer(s), said homopolymers and copolymers having values of MFR, obtained without degradation treatments, from 500 to 2500 g/10 min., or combinations of the said homopolymers or copolymers;
B) a filler or pigment, or their combinations; and optionally
C) from 0.5 to 5% by weight, with respect to the total weight of A), B) and C), of a compatibilizer.

7 Claims, No Drawings

POLYPROPYLENE COMPOSITIONS CONTAINING FILLERS AND/OR PIGMENTS

The present invention concerns polypropylene compositions containing fillers and/or pigments, having an improved balance of processability and mechanical properties.

In particular, the compositions of the present invention have relatively high values of Melt Flow Rate, hereinafter abbreviated into MFR, notwithstanding the presence of significant and even very high amounts of fillers and/or pigments, associated with a very favorable and unusual balance of mechanical properties.

In order to increase the final MFR values of such kind of compositions, it has been already suggested in the art to use propylene polymers with high MFR values. In particular, according to U.S. Pat. No. 4,997,875, improved melt flow characteristics and good mechanical properties are obtained by blending up to 50% by weight of a fiber reinforcing agent to an as-polymerized propylene polymer material having MFR values from about 55 to about 430 g/10 min.

According to U.S. patent application No. 20060264557, reinforced polypropylene compositions with good impact properties are obtained by blending even high amounts of organic fibers and optionally inorganic fillers to a polypropylene resin, having a MFR of from about 20 to about 1500 g/10 min. Actually the highest MFR values of the propylene polymers used in the examples of the said document are of 400-430 g/10 min.

It has now been found that an improved balance of flexural modulus, impact resistance, tensile properties and heat deflection temperature (hereinafter HDT), is achieved by blending fillers and/or pigments with as-polymerized propylene polymers having very high MFR values.

Moreover, in comparison with compositions known in the art with lower MFR, the high MFR compositions of the invention present higher ability to fill the cavity of moulds, even with complex design, and bring to a reduction of cycle times in injection moulding applications.

The use of very high flow polypropylene resins allows also to load high amounts of fillers (in particular glass fibers) in the compositions, so that, given the improved mechanical properties, it is also possible to reduce the thickness of moulded items produced.

In detail, the present invention provides compositions having a MFR value, measured according to ISO 1133 with a load of 2.16 kg at 230° C., from 15 to 200 g/10 min., preferably from 20 to 200 g/10 min., more preferably from 50 to 200 g/10 min., and comprising:

A) a propylene polymer or polymer composition selected from propylene homopolymers or copolymers of propylene containing up to 5% by moles, preferably up to 3% by moles of comonomer(s), said homopolymers and copolymers having values of MFR, obtained without degradation treatments, from 500 to 2500 g/10 min., preferably from 1200 to 2500 g/10 min., more preferably from 1500 to 2500 g/10 min., most preferably from 1600 to 2500 g/10 min., or combinations of the said homopolymers or copolymers;
B) a filler or pigment, or their combinations; and optionally
C) from 0.5 to 5% by weight, with respect to the total weight of A), B) and C), of a compatibilizer.

The MFR of the propylene homopolymers and copolymers of component A) is measured according to ISO 1133 with a load of 2.16 kg at 230° C. as well.

Preferably the compositions of the present invention comprise from 10% to 80% by weight, more preferably from 20% to 70% by weight of A) and from 20% to 90% by weight, more preferably from 30% to 80% by weight of B) with respect to the total weight of A) and B). When also component C) is present, the compositions of the present invention preferably comprise from 10% to 75% by weight, more preferably from 30% to 67% by weight of A), from 20% to 89% by weight, more preferably from 30% to 69% by weight of B) and from 0.5% to 5% by weight, more preferably from 0.5% to 3% by weight of C) with respect to the total weight of A), B) and C).

Component A) as defined above is a propylene polymer or polymer composition having very high MFR values, even higher than 1000 g/10 min. Moreover such MFR values are obtained without any degradation treatment. In other words, component A) is made of as-polymerized propylene polymers, not subjected after polymerization to any treatment able to substantially change the MFR value. Thus, also the molecular weights of component A) are substantially those directly obtained in the polymerization process used to prepare the propylene polymers.

As will be shown in the examples, the very advantageous balance of properties of the compositions of the present invention is not achieved when the said MFR values are obtained by degradation (visbreaking) of propylene polymers having lower MFR values. Typically the comonomers in the propylene copolymers that can be present in component A) are selected from ethylene and/or $C_4$-$C_8$ α-olefins, such as for example butene-1, pentene-1,4-methylpentene-1, hexene-1 and octene-1. The preferred comonomers are ethylene and butene-1.

All the propylene polymers and copolymers of component A) can be prepared by using a Ziegler-Natta catalyst or a metallocene-based catalyst system in the polymerization process. The said catalysts and the polymerization processes are known in the art.

Conventional molecular weight regulators known in the art, such as chain transfer agents (e.g. hydrogen or $ZnEt_2$), may be used.

Preferred examples of Ziegler-Natta catalysts are the supported catalyst systems comprising a trialkylaluminum compound, optionally an electron donor, and a solid catalyst component comprising a halide or halogen-alcoholate of Ti and optionally an electron-donor compound supported on anhydrous magnesium chloride. Catalysts having the above-mentioned characteristics are well known in the patent literature; particularly advantageous are the catalysts described in U.S. Pat. No. 4,399,054 and EP-A-45 977. Other examples can be found in U.S. Pat. No. 4,472,524.

Examples of specific Ziegeler-Natta catalysts and polymerization processes suited for preparing the propylene polymers of component A) are disclosed in EP0622380.

Preferably, when the propylene polymers of component A) are prepared with Ziegler-Natta catalysts they have, at an MFR ranging from 600 to 1000 g/10 min., Mw values from 100,000 to 60,000, and at an MFR of higher than 1000 g/10 nim., Mz values higher than or equal to 140000, as disclosed in the said EP0622380.

Other preferred features for the said propylene polymers prepared with Ziegler-Natta catalysts are:
Mz/Mw values from 2.5 to 2.8;
Isotacticity Index, in terms of weight fraction insoluble in xylene at room temperature (about 25° C.) higher than or equal to 95%, more preferably higher than or equal to 97%.

More preferably, the propylene polymers of component A) are obtained directly in polymerization in the presence of a metallocene-based catalyst system.

The polymerization conditions in general do not need to be different from those used with Ziegler-Natta catalysts.

The preferred metallocene-based catalyst system is obtainable by contacting:
a) a metallocene compound of formula (I)

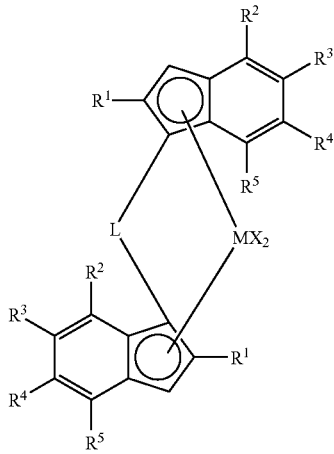

wherein
M is a transition metal belonging to group 3, 4, 5, 6 or to the lanthanide or actinide groups in the Periodic Table of the Elements; preferably M is titanium, zirconium or hafnium; X, same or different, are hydrogen atoms, halogen atoms, or R, OR, $OSO_2CF_3$, OCOR, SR, $NR_2$ or $PR_2$ groups, wherein R are linear or branched, cyclic or acyclic, $C_1$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; preferably R is a linear or branched $C_1$-$C_{20}$-alkyl radical; or two X can optionally form a substituted or unsubstituted butadienyl radical or a OR'O group wherein R' is a divalent radical selected from $C_1$-$C_{40}$ alkylidene, $C_6$-$C_{40}$ arylidene, $C_7$-$C_{40}$ alkylarylidene and $C_7$-$C_{40}$ arylalkylidene radicals; preferably X is a hydrogen atom, a halogen atom or a R group; more preferably X is chlorine or a $C_1$-$C_{10}$-alkyl radical; such as methyl, or ethyl radicals;
L is a divalent $C_1$-$C_{40}$ hydrocarbon radical optionally containing heteroatoms belonging to groups 13-17 of the Periodic Table of the Elements or a divalent silylidene radical containing up to 5 silicon atom; preferably L is a divalent bridging group selected from $C_1$-$C_{40}$ alkylidene, $C_3$-$C_{40}$ cycloalkylidene, $C_6$-$C_{40}$ arylidene, $C_7$-$C_{40}$ alkylarylidene, or $C_7$-$C_{40}$ arylalkylidene radicals optionally containing heteroatoms belonging to groups 13-17 of the Periodic Table of the Elements, and silyliene radical containing up to 5 silicon atoms such as $SiMe_2$, $SiPh_2$; preferably L is a group $(Z(R'')_2)_n$ wherein Z is a carbon or a silicon atom, n is 1 or 2 and R'' is a $C_1$-$C_{20}$ hydrocarbon radical optionally containing heteroatoms belonging to groups 13-17 of the Periodic Table of the Elements; preferably R'' is a linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_1$-$C_{20}$-arylalkyl radicals optionally containing heteroatoms belonging to groups 13-17 of the Periodic Table of the Elements; more preferably the group $(Z(R'')_2)_n$ is $Si(CH_3)_2$, $SiPh_2$, SiPhMe, $SiMe(SiMe_3)$, $CH_2$, $(CH_2)_2$, and $C(CH_3)_2$; even more preferably $(Z(R'')_2)_n$ is $Si(CH_3)_2$.

$R^1$ is a $C_1$-$C_{40}$ hydrocarbon radical optionally containing heteroatoms belonging to groups 13-17 of the Periodic Table of the Elements; preferably $R^1$ is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical; optionally containing heteroatoms belonging to groups 13-17 of the Periodic Table of the Elements; more preferably $R^1$ is a linear or branched, saturated or unsaturated $C_1$-$C_{20}$-alkyl radical;

$R^2$, $R^3$, $R^4$ and $R^5$, equal to or different from each other, are hydrogen atoms or $C_1$-$C_{40}$ hydrocarbon radicals optionally containing heteroatoms belonging to groups 13-17 of the Periodic Table of the Elements; or two R groups among $R^2$, $R^3$, $R^4$ and $R^5$ form a $C_4$-$C_7$ ring that can be unsaturater or saturated optionally containing containing heteroatoms belonging to groups 14-16 of the Periodic Table of the Elements; the ring formed can bear $C_1$-$C_{20}$ hydrocarbon substituents;

b) at least an alumoxane or a compound able to form an alkylmetallocene cation.

The alumoxanes are considered to be linear, branched or cyclic compounds containing at least one group of the type:

wherein the substituents U, same or different, are hydrogen atoms, halogen atoms, $C_1$-$C_{20}$-alkyl, $C_3$-$C_{20}$-cycloalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen.

In particular, alumoxanes of the formula:

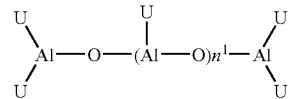

can be used in the case of linear compounds, wherein $n^1$ is 0 or an integer of from 1 to 40 and the substituents U are defined as above; or alumoxanes of the formula:

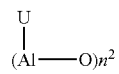

can be used in the case of cyclic compounds, wherein $n^2$ is an integer from 2 to 40 and the U substituents are defined as above.

A specific example of metallocene compound a) is rac-dimethylsilylbis(2-methyl-4,5-benzo-indenyl)-zirconium dichloride.

Examples of suitable alumoxanes are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO).

Examples of compounds able to form an alkylmetallocene cation are compounds of formula $D^+E^-$, wherein $D^+$ is a Brønsted acid, able to donate a proton and to react irreversibly with a substituent X of the metallocene of formula (I) and $E^+$ is a compatible anion, which is able to stabilize the active catalytic species originating from the reaction of the two compounds, and which is sufficiently labile to be removed by an olefinic monomer. Preferably, the anion $E^+$ comprises one or more boron atoms. More preferably, the anion $E^+$ is an anion of the formula $BAr_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred compound, as described in WO 91/02012. Moreover, compounds of formula $BAr_3$ can be conveniently used. Compounds of this type are described, for example, in the International patent application WO 92/00333. Other examples of compounds able to form an alkylmetallocene cation are compounds of formula $BAr_3P$ wherein P is a substituted or unsubstituted pyrrol radical. These compounds are described in WO01/62764. All these compounds containing boron atoms can be used in a molar ratio between boron and the metal of the metallocene comprised between about 1:1 and about 10:1; preferably 1:1 and 2:1; more preferably about 1:1.

Other preferred features for the said propylene polymers prepared with a metallocene-based catalyst system are:
- distribution of molecular weight Mw/Mn lower than 4; more preferably lower than 3; most preferably lower than 2.7;
- isotactic pentads (mmmm) measured with $^{13}C$-NMR, higher than 90%; more preferably higher than 92%;
- xylene solubles at 25° C. below 2% by weight, more preferably below 1.6% by weight;
- melting point measured by means of DSC, higher than 143° C.

The filler component B) to be used in the compositions of the present invention can be organic or inorganic.

Preferred are fibers, both organic and inorganic, and the inorganic fillers (different from fibers), such as metallic flakes, glass flakes, milled glass, glass spheres and mineral fillers, like talc, calcium carbonate, mica, wollastonite or silicates in general, kaolin, barium sulfate, metal oxides and hydroxides.

Another suited filler is wood flour.

The pigments include organic and inorganic substances, such as carbon black, $TiO_2$, ZnO, chromium oxides, iron oxides, azo pigments, phthalocyanines, quinacridones, perylene pigments, naphthalene derivates, isoindolines, anthraquinone pigments.

Suitable fibers for the present compositions include fibers made of glass, metal, ceramic, graphite, and organic polymers such as polyesters and nylons, e.g., aramids, in filamentary form, all of which are commercially available.

Glass fibers are preferred.

The glass fibers may be either cut glass fibers or long glass fibers, or may be in the form of continuous filament fibers, although preference is given to using cut glass fibers, also known as short fibers or chopped strands.

In general, the glass fibers can have a length of from 1 to 50 mm.

The cut or short glass fibers used in the compositions of the present invention preferably have a length of from 1 to 6 mm, more preferably from 3 to 4.5 mm, and a diameter of from 10 to 20 µm, more preferably from 12 to 14 µm.

As previously said, the polypropylene compositions of the present invention can also comprise a compatibilizer C).

One type which can be used are low molecular weight compounds having reactive polar groups, which serve to make the fillers and pigments less hydrophilic and therefore more compatible with the polymer. Suitable compounds are, for example, silanes such as aminosilanes, epoxysilanes, amidosilanes or acrylosilanes.

However, the compatibilizers preferably comprise a modified (functionalized) polymer and optionally a low molecular weight compound having reactive polar groups. Modified olefin polymers, in particular propylene homopolymers and copolymers, like copolymers of ethylene and propylene with each other or with other alpha olefins, are most preferred, as they are highly compatible with the component A) of the compositions of the present invention. Modified polyethylene can be used as well.

In terms of structure, the modified polymers are preferably selected from graft or block copolymers.

In this context, preference is given to modified polymers containing groups deriving from polar compounds, in particular selected from acid anhydrides, carboxylic acids, carboxylic acid derivatives, primary and secondary amines, hydroxyl compounds, oxazoline and epoxides, and also ionic compounds.

Specific examples of the said polar compounds are unsaturated cyclic anhydrides and their aliphatic diesters, and the diacid derivatives. In particular, one can use maleic anhydride and compounds selected from $C_1$-$C_{10}$ linear and branched dialkyl maleates, $C_1$-$C_{10}$ linear and branched dialkyl fumarates, itaconic anhydride, $C_1$-$C_{10}$ linear and branched itaconic acid dialkyl esters, maleic acid, fumaric acid, itaconic acid and mixtures thereof.

Particular preference is given to using a propylene polymer grafted with maleic anhydride as the modified polymer.

The low molecular weight compound serves to couple the filler or pigment to the modified polymer and thus to bind it securely to the propylene polymer component A). These are usually bifunctional compounds, in which case one functional group can enter into a binding interaction with the filler or pigment and the second functional group can enter into a binding interaction with the modified polymer. The low molecular weight compound is preferably an amino- or epoxysilane, more preferably an aminosilane.

When the filler B) comprises glass fibers, the aminosilanes bond with the silane hydroxyl groups to the glass fiber, while the amino groups form a stable amide bond, for example with polypropylene grafted with maleic anhydride.

It is particularly advantageous to apply the low molecular weight compound to the glass fibers before they are incorporated into the composition.

The modified polymer can be produced in a simple manner by reactive extrusion of the polymer, for example with maleic anhydride in the presence of free radical generators (like organic peroxides), as disclosed for instance in EP0572028.

Preferred amounts of groups deriving from polar compounds in the modified polymers are from 0.5 to 3% by weight.

Preferred values of MFR for the modified polymers are from 50 to 400 g/10 min.

It is also possible to use a masterbatch which comprises the fillers and/or pigments and the compatibilizer in premixed form.

The polypropylene compositions according to the invention are obtainable by melting and mixing the components, and the mixing is effected in a mixing apparatus at temperatures generally of from 180 to 320° C., preferably from 200 to 280° C., more preferably from 200 to 260° C.

Any known apparatus and technology can be used for this purpose.

Useful mixing apparatus in this context are in particular extruders or kneaders, and particular preference is given to twin-screw extruders. It is also possible to premix the components at room temperature in a mixing apparatus.

Preference is given to initially melting component A) and optionally component C), and subsequently mixing component B) with the melt, in order to reduce the abrasion in the mixing apparatus and the fiber breakage (when fibers are used as filler).

During the preparation of the polypropylene compositions of the present invention, besides the two main components A) and B) and possibly some compatibilizing agents C), it is possible to introduce additives commonly employed in the art, such as stabilizing agents (against heat, light, U.V.), plasticizers, antistatic and water repellant agents.

Particularly preferred features for the compositions of the present invention are:

Density: from 1.1 to 4.5 kg/dm$^3$, more preferably from 1.1 to 1.8 kg/dm$^3$;
Flexural Modulus: from 2500 to 19000 MPa, more preferably from 5000 to 16000 MPa;
Tensile Modulus: from 2500 to 20000 MPa, more preferably from 5000 to 17000 MPa;
Charpy unnotched at 23° C.: from 30 to 200 kJ/m$^2$, more preferably from 35 to 65 kJ/m$^2$;
Charpy unnotched at −30° C.: from 30 to 150 kJ/m$^2$, more preferably from 40 to 65 kJ/m$^2$;
Charpy notched at 23° C.: from 5 to 200 kJ/m$^2$, more preferably from 10 to 20 kJ/m$^2$;
Charpy notched at −30° C.: from 5 to 150 kJ/m$^2$, more preferably from 8 to 25 kJ/m$^2$;
Tensile Strength at break: from 50 to 150 MPa, more preferably from 80 to 135 MPa;
Elongation at break: from 1 to 200%, more preferably from 1 to 3%;
HDT 1.82 MPa: from 60 to 155° C., more preferably from 135 to 155° C.

When fillers different from glass fibers are used, preferred features for the compositions of the present invention are:

Density: from 1.1 to 4.5 kg/dm$^3$, more preferably from 1.1 to 1.9 kg/dm$^3$;
Flexural Modulus: from 2500 to 12000 MPa, more preferably from 4000 to 10000 MPa;
Tensile Modulus: from 2500 to 20000 MPa, more preferably from 5000 to 10000 MPa;
Charpy unnotched at 23° C.: from 2 to 15 kJ/m$^2$, more preferably from 3 to 12 kJ/m$^2$;
Charpy notched at 23° C.: from 1 to 10 kJ/m$^2$, more preferably from 1 to 7 kJ/m$^2$.

Due to their favorable balance of properties, the compositions of the present invention can be used in many applications, like injection moulded articles, in particular parts for automotive, electrical appliances, furniture, or formed articles in general, in particular sheets, parts for electrical appliances, furniture, housewares, or as hyper-filled masterbatches.

In particular, when the amount of component B) is particularly high, indicatively from 60% to 90% by weight with respect to the total weight of A) and B), the compositions of the present invention can also be advantageously used as concentrates, to introduce fillers and/or pigments in polymer compositions, in particular polyolefin compositions, by blending with additional polymers, to get a molded item with a filler content and modulus according to the needs.

The following examples are given for illustrating but not limiting purposes.

The following analytical methods are used to determine the properties reported in the description and in the examples.
Melt Flow Rate (MFR): ISO 1133 with a load of 2.16 kg at 230° C.;
Intrinsic Viscosity: Measured in tetrahydronaphthalene at 135° C.;
Density: ISO 1183;
Flexural Modulus (secant): ISO 178 on rectangular specimens 80×10×4 mm from T-bars ISO527-1 Type 1A;
Tensile Modulus (secant): ISO 527/-1, -2 on specimens Type 1A with velocity of 1 mm/min, span of 50 mm;
Charpy unnotched: ISO 179 (type 1, edgewise) on rectangular specimens 80×10×4 mm from T-bars ISO527-1 Type 1A;
Charpy notched: ISO 179 (type 1, edgewise, Notch A) on rectangular specimens 80×10×4 mm from T-bars ISO0527-1 Type 1A;
Tensile Strength at Break: ISO 527/-1, -2 on specimens Type 1A with velocity of 50 mm/min, span of 50 mm;
Elongation at Break: ISO 527/-1, -2 on specimens Type 1A with velocity of 50 mm/min, span of 50 mm;
HDT (1.80 MPa): (heat deflection temperature) ISO 75A -1.-2 on specimens clause 6.

T-bar Preparation (Injection Moulded)

Test Specimens are Injection Moulded According to Test Method Iso 1873-2 (1989).

Determination of Isotacticity Index (Solubility in Xylene at Room Temperature, in % by Weight)

2.5 g of polymer and 250 cm$^3$ of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 cm$^3$ of the filtered liquid is poured in a previously weighed aluminum container which is heated on a heating plate under nitrogen flow, to remove the solvent by evaporation. The container is then kept in an oven at 80° C. under vacuum until constant weight is obtained. The weight percentage of polymer soluble in xylene at room temperature is then calculated.

The percent by weight of polymer insoluble in xylene at room temperature is considered the isotacticity index of the polymer. This value corresponds substantially to the isotacticity index determined by extraction with boiling n-heptane, which by definition constitutes the isotacticity index of polypropylene.

MWD Determination

The Mn and Mw values are measured by way of gel permeation chromatography (GPC) at 145° C. using a Alliance GPCV 2000 instrument (Waters) equipped with three mixed-bed columns TosoHaas TSK GMHXL-HT having a particle size of 13 μm. The dimensions of the columns are 300×7.8 mm. The mobile phase used is vacuum distilled 1,2,4-Trichlorobenzene (TCB) and the flow rate is kept at 1.0 ml/min. The sample solution is prepared by heating the sample under stirring at 145° C. in TCB for two hours. The concentration is 1 mg/ml. To prevent degradation, 0.1 g/l of 2,6-diterbutyl-p-cresol are added. 326.5 μL of solution are injected into the column set. A calibration curve is obtained using 10 polystyrene standard samples (EasiCal kit by Polymer Laboratories) with molecular weights in the range from 580 to 7500000; additionally two other standards with peak molecular weight of 11600000 and 13200000 from the same manufacturer are included. It is assumed that the K values of the Mark-Houwink relationship are:

$K=1.21\times10^{-4}$ dL/g and $\alpha=0.706$ for the polystyrene standards;
$K=1.90\times10^{-4}$ dL/g and $\alpha=0.725$ for the polypropylene samples;
$K=1.93\times10^{-4}$ dL/g and $\alpha=0.725$ for the propylene copolymer samples.

A third order polynomial fit is used for interpolate the experimental data and obtain the calibration curve. Data acquisition and processing is done by using Empower 1.0 with GPCV option by Waters.

Melting Temperature

Determined by DSC according ISO 3146 with a heating rate of 20K per minute.

$^{13}$C-NMR (for Metallocene-Produced Propylene Polymers)

NMR analysis. 13C-NMR spectra of PP are acquired on a DPX-400 spectrometer operating at 100.61 MHz in the Fourier transform mode at 120° C. The peak of the mmmm pentad carbon are used as internal reference at 21.8 ppm and 29.9 ppm respectively. The samples are dissolved in 1,1,2,2-tetra-chloroethane-d2 at 120° C. with a 8% wt/v concentration in a 5 mm tube. Each spectrum is acquired with a 90° pulse, 12 seconds of delay between pulses and CPD (WALTZ 16) to remove 1H-13C coupling. About 2500 transients are stored in 32K data points using a spectral window of 6000 Hz.

The assignments of PP spectra are made according to "Selectivity in Propylene Polymerization with Metallocene Catalysts", L. Resconi, L. Cavallo, A. Fait, F. Piemontesi, Chem. Rev., 100, 1253, (2000))

The mmmm content is obtained modelling the experimental pentad distribution with the enantiomorphic site model. The mmmm content of PP with high content of 2.1 (E) and 1.3 (H) errors is obtained as:

$$[mmmm]=100(\Sigma[CH_3]-5[mrrm]-5[E]-5[H])/(\Sigma[CH_3])$$

where $\Sigma[CH_3]$ is the sum of all $CH_3$ groups.

The content of 2.1 and 3.1 errors is obtained as:

$$[E]=100(E_9/\Sigma[CH_2])$$

$$[H]=100(0.5H_2/\Sigma[CH_2])$$

where $E_9$ is the peak at 42.14 ppm, $H_2$ is the peak at 30.82 ppm and $\Sigma[CH_2]$ is the sum of all $CH_2$ groups.

Examples 1 and 2 and Comparative Examples 1 and 2

The Following Materials Are Used As Components A), B) And C).

Component A)

PP-1: Propylene homopolymer, with MFR of 550 g/10 min, Mw/Mn of 2.3 and isotacticity index in xylene at room temperature of 98.7% (isotactic pentades (mmmm) higher than 92%), DSC melting temperature of 145.3° C., intrinsic viscosity of 0.69 dl/g, in form of pellets;

PP-2: Propylene homopolymer, with MFR of 2300 g/10 min, Mw/Mn of 2.6 and isotacticity index of 98.5%, DSC melting temperature of 146° C. and intrinsic viscosity of 0.47, in form of pellets;

PP-3: Propylene homopolymer, with MFR of 12 g/10 min, Mw/Mn of 5.4 and isotacticity index of 96.7%, in form of pellets;

PP-4: Propylene homopolymer, with MFR of 800 g/10 min, Mw/Mn of 4.3 and isotacticity index of 96%, in spherical form, visbroken from MFR 400.

PP-1 and PP-2 are obtained with a catalyst system prepared as described in PCT/EP2004/007061 by using rac-dimethylsilylbis(2-methyl-4,5-benzo-indenyl)-zirconium dichloride.

The catalyst system in the form of catalyst mud obtained as described in PCT/EP2004/007061 is fed in a precontact vessel in which it is diluted with about 5 Kg/h of propane. From the pre-contact vessel the catalyst system is fed to a prepolymerization loop in which propylene is fed at the same time. The residence time of the catalyst in the prepolymerization loop is 8 minutes. The prepolymerized catalyst obtained in the prepolymerization loop is then continuously fed into a loop reactor in which propylene is fed at a rate of 329 Kg/h in the case of PP-1 and 340 Kg/h in the case of PP-2. The polymerization temperature is of 70° C. The polymer is discharged from the loop reactor, separated from the unreacted monomer and dried. The MFR of the product is controlled by the feed of hydrogen, to be adjusted to get the required MFR of the polymer. In the case of PP-1 the hydrogen concentration is of 550 ppm, in the case of PP-2 it is of 1080 ppm.

Component B)

GF: Glass fibers White ECS O3T 480 (Nippon Electric Glass Company Ltd), with fiber length of 3 mm and diameter of 13 µm.

Component C)

PP-MA: Propylene homopolymer grafted with maleic anhydride (MA), with MFR of 115 g/10 min and MA content of 1% weight (Polybond 3200, sold by Chemtura).

Component A) contains also about 0.3% by weight of conventional antioxidant additives. The composition are prepared by extrusion, using a twin screw extruder, model Werner&Pfleiderer ZSK40SC.

This line has a process length of approx 43 L/D and is provided with gravimetric feeders. Components A) and C) are fed into the first barrel and component B) is fed into the fifth barrel, via forced side feeding.

A strand die plate with cooling bath and strand cutter Scheer SGS100 is used to form pellets; vacuum degassing (barrel No. 8) is also applied to extract fumes and decomposition products.

Running Conditions:

Screw speed: 200 rpm;

Capacity: 50-60 kg/h;

Barrel Temperature: 200-220° C.

The final properties of the so obtained composition are reported in Table I, together with the relative amounts of the components.

TABLE I

| Example No. | 1 | 2 | Comp. 1 | Comp. 2 |
|---|---|---|---|---|
| COMPONENTS (% by weight) | | | | |
| PP-1 | 47.5 | | | |
| PP-2 | | 47.5 | | |
| PP-3 | | | 47.5 | |
| PP-4 | | | | 47.5 |
| GF | 50 | 50 | 50 | 50 |
| PP-MA | 2.5 | 2.5 | 2.5 | 2.5 |
| PROPERTIES | | | | |
| MFR (dg/min) | 21 | 150 | 2.6 | 23.5 |
| Density (kg/dm$^3$) | 1.329 | 1.318 | 1.336 | 1.329 |
| Flexural Modulus (MPa) | 11350 | 11120 | 10850 | 11240 |
| Tensile Modulus (MPa) | 12060 | 11320 | 11410 | 11570 |
| Charpy unnotched at 23° C. (kJ/m$^2$) | 58 | 57 | 46.5 | 43 |
| Charpy unnotched at −30° C. (kJ/m$^2$) | 60 | 51 | 55 | 44 |
| Charpy notched at 23° C. (kJ/m$^2$) | 13.4 | 12.7 | 12 | 12.6 |
| Charpy notched at −30° C. (kJ/m$^2$) | 18 | 17 | 18.3 | 16.8 |

TABLE I-continued

| Example No. | 1 | 2 | Comp. 1 | Comp. 2 |
|---|---|---|---|---|
| Tensile Strength at break (MPa) | 131 | 123.8 | 122 | 125 |
| Elongation at break (%) | 1.7 | 1.4 | 2.1 | 1.3 |
| HDT 1.82 MPa (° C.) | 153 | 143 | 152 | 154 |

Note:
Comp. = Comparison

Spiral Flow Test

A single cavity endless spiral flow mould with 2.5 mm depth is used, and the compositions of Example 2 and Comparative Example 1 are injected at a constant melt temperature of 230° C., at different injection pressures (2, 4, 6, 8, 10 MPa).

The injection moulding machine is the Sandretto Model 190 with 190 ton clamping force; the mould temperature is 40° C.

Under these conditions, for every injection pressure, the flow path length expressed in millimeter, which is proportional to the flowability of the material, is measured.

The results are reported in the following Table II.

TABLE II

| Pressure | 2 MPa | 4 MPa | 6 MPa | 8 MPa | 10 MPa |
|---|---|---|---|---|---|
| Ex. 2: flow path length | 770 | 1270 | 1690 | 2000 | >2000 |
| Comp. Ex. 1: flow path length | 80 | 260 | 425 | 600 | 720 |

As shown in the table above, the composition of Example 2 presents a much higher spiral flow length for every injection moulding pressure, with respect to the composition of Comparative Example 1.

This means that the compositions of the invention can fill more easily the mould cavities, even those with complex design, allowing to reduce injection moulding pressure, with less problems of warpage, and to reduce moulding cycle times with an economical advantage in terms of productivity.

Examples 3 and 4 and Comparative Example 3

Filled compositions are prepared by extruding the same PP-1, PP-2 and PP-3 polymer materials used in the previous examples (component A)), with talc HM05 (supplier IMI Fabi S.p.A) in fine white powder at visual inspection, with tamped density=0.31 g/ml and with more than 95% by weight of particles having size of less than 5 μm (component B)). The extrusion is carried out in a single screw extruder, cokneader Buss model MDK70 with 70 mm diameter screw, 17 L/D process length.

The component A) is fed through the first feeding port while component B) is preferably fed through two vertical feeding ports in the melt phase.

The operating parameters are the following:
Screw speed: 270 rpm;
Capacity: 50-60 kg/h;
Barrel temperature: 200-230° C.

A strand die plate with cooling bath and strand cutter is used to form pellets; vacuum degassing is also applied to extract fumes and decomposition products.

The final properties of the so obtained compositions are reported in Table III, together with the relative amounts of the components.

The spiral flow test is carried out as previously described.

TABLE III

| Example No. | 3 | 4 | Comp. 3 |
|---|---|---|---|
| COMPONENTS (% by weight) | | | |
| PP-1 | 60 | | |
| PP-2 | | 40 | |
| PP-3 | | | 40 |
| Talc HM05 | 40 | 60 | 60 |
| PROPERTIES | | | |
| MFR (dg/min) | 132 | 62 | 0.5 |
| Density (kg/dm$^3$) | 1.241 | 1.527 | 1.531 |
| Flexural Modulus (MPa) | 5050 | 7200 | 6800 |
| Tensile Modulus (MPa) | 4780 | 6450 | 6100 |
| Charpy unnotched at 23° C. (kJ/m$^2$) | 6.8 | 6.4 | 7.2 |
| Charpy notched at 23° C. (kJ/m$^2$) | 1.6 | 1.4 | 1.5 |
| Tensile Strength at break (MPa) | 29 | 30 | 30 |
| Elongation at break (%) | 1.3 | 1.1 | 1.1 |
| Spiral flow length at 2 MPa (mm) | | 670 | 230 |
| Spiral flow length at 4 MPa (mm) | | 1140 | 455 |
| Spiral flow length at 6 MPa (mm) | | 1470 | 635 |
| Spiral flow length at 8 MPa (mm) | | 1800 | 825 |
| Spiral flow length at 10 MPa (mm) | | >2000 | 1010 |

The invention claimed is:

1. Polypropylene compositions comprising a MFR value ranging from 15 to 200 g/10 min., measured according to ISO 1133 with a load of 2.16 kg at 230° C.; the polypropylene compositions comprising:
   A) a propylene polymer or polymer composition selected from propylene homopolymers or copolymers of propylene containing up to 5% by moles of comonomer(s), said homopolymers and copolymers having values of MFR, obtained without degradation treatments, from 1600 to 2500 g/10 min., or combinations of the homopolymers or copolymers;
   B) glass fibers; and optionally
   C) a compatibilzer present in an amount from 0.5 to 5% by weight of a compatibilizer, with respect to the total weight of A), B) and C).

2. The compositions of claim 1, wherein the propylene homopolymers and copolymers of component A) are obtained directly from a polymerization process comprising a metallocene-based catalyst system.

3. The compositions of claim 1, wherein the propylene homopolymers and copolymers of component A) have a molecular weight distribution of lower than 4, in terms of Mw/Mn ratio.

4. The compositions of claim 1 comprising from 10% to 80% by weight of A) and from 20% to 90% by weight of B), with respect to the total weight of A) and B).

5. The compositions of claim 1 comprising from 10% to 75% by weight of A), from 20% to 89% by weight of B), and from 0.5% to 5% by weight of C), with respect to the total weight of A), B) and C).

6. An article produced by injection molding, extrusion, or thermoforming comprising a polypropylene composition comprising a MFR value ranging from 15 to 200 g/10 min., measured according to ISO 1133 with a load of 2.16 kg at 230° C.; the polypropylene compositions comprising:

A) a propylene polymer or polymer composition selected from propylene homopolymers or copolymers of propylene containing up to 5% by moles of comonomer(s), said homopolymers and copolymers having values of MFR, obtained without degradation treatments, from 1600 to 2500 g/10 min., or combinations of the homopolymers or copolymers;

B) glass fibers; and optionally

C) a compatibilizer present in an amount from 0.5 to 5% by weight of a compatibilizer, with respect to the total weight of A), B) and C).

7. Concentrates comprising a polypropylene composition comprising a MFR value ranging from 15 to 200 g/10 min., measured according to ISO 1133 with a load of 2.16 kg at 230° C.; the polypropylene compositions comprising:

A) a propylene polymer or polymer composition selected from propylene homopolymers or copolymers of propylene containing up to 5% by moles of comonomer(s), said homopolymers and copolymers having values of MFR, obtained without degradation treatments, from 1600 to 2500 g/10 min., or combinations of the homopolymers or copolymers;

B) glass fibers; and optionally

C) a compatibilizer present in an amount from 0.5 to 5% by weight of a compatibilizer, with respect to the total weight of A), B) and C).

* * * * *

UNITED STATES PATENT AND TRADEMARK OFFICE
CERTIFICATE OF CORRECTION

PATENT NO. : 8,716,394 B2  Page 1 of 1
APPLICATION NO. : 12/448384
DATED : May 6, 2014
INVENTOR(S) : Enrico Masarati et al.

It is certified that error appears in the above-identified patent and that said Letters Patent is hereby corrected as shown below:

Specification
Column 3    Line 32    Delete "$C_1$-$C_{40}$ alkenyl," and insert --$C_1$-$C_{40}$-alkyl, $C_2$-$C_{40}$ alkenyl,--
Column 3    Line 62    Delete "$C_1$-$C_{20}$-arylalkyl" and insert --$C_7$-$C_{20}$-arylalkyl--
Column 4    Line 65    Delete "$E^+$" and insert --$E^-$--
Column 5    Line 2     Delete "$E^+$" and insert --$E^-$--
Column 5    Line 3     Delete "$E^+$" and insert --$E^-$--
Column 8    Line 22    Delete "Weight)" and insert --weight)--
Column 9    Line 26    Delete "2.1 (E) and 1.3" and insert --2,1 (E) and 1,3--
Column 9    Line 31    Delete "2.1 and 3.1" and insert --2,1 and 3,1--

Claims
Column 12   Line 45    In Claim 1, delete "compatibilzer" and insert --compatibilizer--

Signed and Sealed this
Fifth Day of April, 2016

Michelle K. Lee
*Director of the United States Patent and Trademark Office*